United States Patent [19]

Drobadenko et al.

[11] Patent Number: 4,978,251
[45] Date of Patent: Dec. 18, 1990

[54] METHOD AND APPARATUS FOR CONVEYING MATERIALS IN BULK BY LIQUID PRESSURE

[75] Inventors: Valery P. Drobadenko; Olga A. Lukonina, both of Moscow, U.S.S.R.

[73] Assignee: Moskovsky Geologorazvedochny Institut Imeni Sergo Ordzhonikidze, Moscow, U.S.S.R.

[21] Appl. No.: 363,135

[22] Filed: Jun. 8, 1989

[30] Foreign Application Priority Data

Jun. 22, 1988 [SU] U.S.S.R. ............... 4437962

[51] Int. Cl.⁵ .................................. B65G 53/24
[52] U.S. Cl. ............................... 406/50; 406/137
[58] Field of Search ............. 406/50, 136, 137, 108, 406/154, 174, 175, 191

[56] References Cited

U.S. PATENT DOCUMENTS

| | | | |
|---|---|---|---|
| 2,734,781 | 2/1956 | Fowler et al. | 406/136 |
| 3,993,359 | 11/1976 | Sweeney | 406/137 |
| 3,994,532 | 11/1976 | Hahn | 406/137 |
| 4,265,572 | 5/1981 | Bourdois et al. | 406/137 |
| 4,580,927 | 4/1986 | Weeks | 406/50 |
| 4,859,121 | 8/1989 | Deysson et al. | 406/136 |

FOREIGN PATENT DOCUMENTS 631410 11/1978 U.S.S.R. ..................... 406/136

Primary Examiner—Joseph F. Peters, Jr.
Assistant Examiner—Stephen P. Avila
Attorney, Agent, or Firm—Fleit, Jacobson, Cohn, Price, Holman & Stern

[57] ABSTRACT

A method for conveying materials in bulk by liquid pressure carried out by an appropriate apparatus involves loading a material in bulk into a chamber through a loading pipe and then supplying liquid under pressure through a pipe for supplying liquid in the form of a downward annular flow, and discharging the material in bulk in an upward flow through a discharge pipe mounted to extend coaxially with, and inside the pipe for supplying liquid. A zone of recirculation flows of liquid is formed in the chamber by swirling the annular flow to an extent determined by a ratio of the rotational component of velocity to the axial component of velocity at least equal to 0.4. The material in bulk is discharged in the zone of recirculation flows. For swirling the annular flow, an inlet port of the pipe for supplying liquid is located in the periphery thereof, and the axis of this port is offset with respect to the axis of the discharge pipe. The inlet and outlet ports of the pipes for material discharge and liquid supply, respectively, are located at predetermined level with respect to each other.

10 Claims, 7 Drawing Sheets

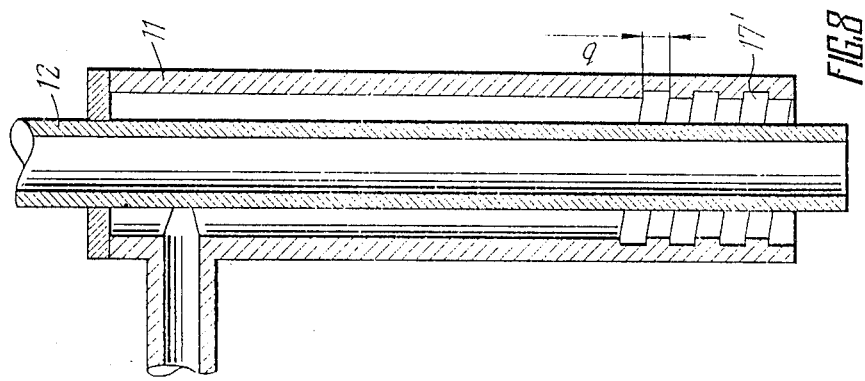
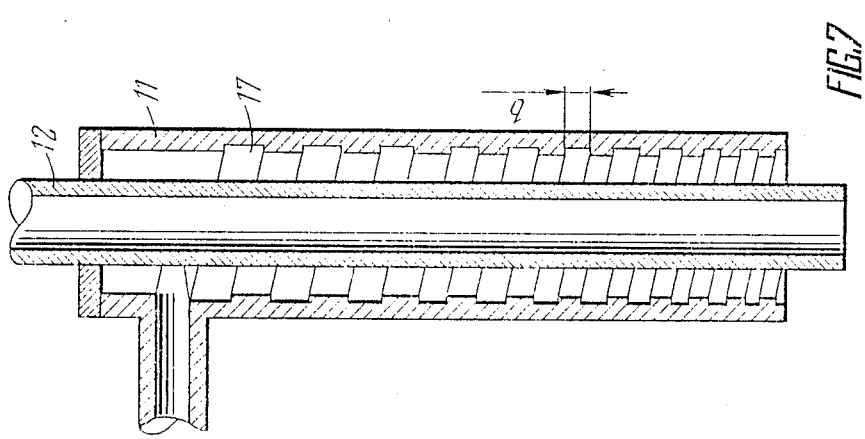

METHOD AND APPARATUS FOR CONVEYING MATERIALS IN BULK BY LIQUID PRESSURE

FIELD OF THE ART

The invention relates to the conveyance of materials by liquid pressure, and more specifically, it deals with a method and apparatus for conveying materials in bulk by liquid pressure.

The invention may be advantageously used in the mining industry, construction, metallurgy and agriculture for a long-range conveyance of materials in bulk by liquid pressure.

It is especially interesting to make use of the invention for conveying materials in bulk by liquid pressure, in particular, in handling mineral raw materials, for the concentration and in working placer and ore deposits by open-pit and underground mining, for handling coal fines at thermal power plants, for conveying concentration tails to stockpiling locations, for transporting rubbish materials and in the water engineering construction.

The employment of the method and apparatus for conveying materials in bulk by liquid pressure is aimed at bringing a solution to the main problem of eliminating contact of particles being conveyed with moving and flow-duct parts of a pressure unit so as to avoid their abrasive wear, the use of much more powerful water pumps to replace low-pressure slurry pumps and the conveyance of high-density slurries.

Background of the Invention

Conventional conveyance of materials in bulk using slurry pumps is carried out with a slurry density of maximum 15%. For a long-range conveyance, it is generally required to provide intermediate pumping stations which may be successfully replaced by a single station consisting of a group of apparatuses for conveying materials by liquid pressure working alternately with one and the same pipeline with a single or with several water pumps to supply high-density slurry through the pipeline so as to enhance an overall throughput capacity of conveyance.

A number of requirements determined by a specific character of operation influencing economic effectiveness and reliability are generally imposed upon such methods and apparatuses for conveying materials in bulk by liquid pressure.

First of all, reliability of methods for conveying by liquid pressure is determined by operation of apparatuses for carrying out such methods in the discharge mode without clogging. The economic effectiveness of apparatuses for conveying materials in bulk by liquid pressure depends on density of prepared slurry pumped into a pipeline, absence of density fluctuations during conveyance, minimum head losses in chambers of the apparatuses and the possibility of preparing and conveying by liquid pressure of slurry of uniform quality, grading and substance composition. It should be noted that density of slurry is directly proportional to specific energy consumption for conveying materials in bulk by liquid pressure. The specific energy consumption depends on losses of head developed by the pump in the chamber which are determined by the method of preparing and discharging slurry and also by position of a pipe for supplying liquid under pressure and pipe for discharging the material in bulk.

Three types of methods for conveying materials in bulk by liquid pressure are now available in which the material in bulk is discharged in a downward flow, in an upward flow, and in a horizontal flow. The least reliable one is a method of discharging in the downward flow which is associated with frequent clogging of the pipe for discharging the material in bulk and which is characterized by a low efficiency of mixing of solid and liquid components in the chamber. The method of horizontally discharging is also accompanied by frequent clogging of the discharge pipe and generally calls for the employment of bypass pipes which negatively affects density of prepared and conveyed slurry.

The method of discharging slurry in the upward flow is the most reliable one from the point of view of clogging.

However, each of the abovedescribed methods is characterized by a continuous decrease in slurry density at the end of the discharge cycle during operation.

In addition, during the cycle, when a material in bulk is supplied to the chamber with different quality and composition the discharge is also carried out generally with non-uniform quality of the material without its homogenization so as to reduce stability of operation of a material handling system as a whole.

Known in the art is a method for conveying materials in bulk by liquid pressure (SU,A,391974), comprising loading a material in bulk into a chamber to fill it up, then supplying liquid under pressure simultaneously to the top part of the chamber and through a bypass pipe to the lower or bottom part of the chamber to mix liquid and solid components of slurry and to discharge the material in bulk in an inclined upward slurry flow from the chamber and to convey the slurry. Density of slurry being discharged is controlled by increasing or decreasing quantity of liquid supplied under pressure to the bottom part of the chamber.

Known in the art is an apparatus for carrying out the method for conveying materials by liquid pressure (SU,A,391974), comprising a vertically extending chamber having a loading gate in the top part thereof.

A pipe for liquid draining is provided in the bottom part of the chamber and communicates with a perforated pipe accommodated in the chamber, and a pipe for supplying liquid under pressure connected to the pipe for liquid draining by means of a bypass pipe is provided in the top part of the chamber.

A pipe for discharging the material in bulk is provided in the bottom part of the chamber and has its end located above the chamber bottom, the draining and discharge pipes having longitudinally extending ports facing towards each other and closable by means of a slide gate.

The inclined position of the discharge pipe cannot eliminate its clogging, especially when working with the closed slide gate. While it is possible to control density of slurry for maintaining it constant, it is, however, impossible to achieve high density values since the longitudinally extending ports should be left maximum open at the beginning of the discharge cycle and, as the ports are located opposite to each other, a part of liquid will be directed to the discharge pipe without entraining the material in bulk. At the end of the cycle, with the shut ports, liquid under pressure will be supplied to the discharge pipe from the top part of the chamber which also causes a decrease in slurry density.

A change in flow of liquid under pressure supplied to the bottom part may be carried out either by a pump or by shifting the slide gate. However, controlling liquid flow by a pump cannot bring about a change in density of slurry prepared in this method.

A change in density is effected by changing position of the slide gate with respect to the ports. This is, however, very difficult because of operation of the slide gate in a direction perpendicular with respect to the direction of liquid supply under pressure and respectively high dynamic loads which results in an additional energy consumption.

The discharge of slurry in the inclined upward flow in the abovedescribed method from the lateral part of the chamber cannot bring about homogenization of the material in bulk in respect of grading and substance composition.

The provision of the bypass pipe in the apparatus and the supply of liquid under pressure alternately through a horizontal liquid supply pipe and through an inclined liquid draining pipe results in substantial head losses in the chamber in carrying out the method which negatively affects the range of conveyance and overall energy power requirements of the method.

Known in the art is also a method for conveying materials in bulk by liquid pressure (DE,A,3144067), comprising loading a material in bulk into a chamber to fill it up, supplying liquid under pressure simultaneously to the top part of the chamber via a bypass pipe, and to the lower or bottom part of the chamber through a pipe for supplying liquid under pressure, causing liquid to move along a helical guide member towards an inlet port of a discharge pipe for mixing liquid and solid components and for discharging the material in bulk from the chamber and conveying it by liquid pressure.

Known in the art is an apparatus for conveying materials in bulk by liquid pressure, comprising a chamber having a frustoconical bottom and a pipe with a gate for loading a material in bulk as well as a bypass pipe having its upper end secured in the top part of the chamber and its lower end connected to a pipe for supplying liquid under pressure. The liquid supply pipe is secured in the bottom part of the chamber in such a manner that its outlet port is located between the chamber wall and an upright metal rod mounted at the center of the chamber bottom. The chamber is also provided with a pipe for discharging a material in bulk extending horizontally in the bottom part of the chamber bottom opposite to, and below the pipe for supplying liquid under pressure.

The apparatus also comprises a guide plate for washing off and discharging the material in bulk extending around the upright rod along the conical surface of the chamber bottom, the upper part of the plate being attached to the chamber wall below the outlet port of the pipe for supplying liquid under pressure and the lower part of the plate being attached above the inlet port of the pipe for discharging the material in bulk in the horizontal flow. A protective baffle plate is provided above the outlet port of the pipe for supplying liquid under pressure on the chamber wall to prevent the outlet port from being clogged with the material in bulk during loading.

The apparatus for carrying out the discharge in the horizontal flow cannot prevent clogging of the inlet port of the discharge pipe even with the provision of the protective baffle plate. Special difficulties arise with starting of the apparatus at the beginning of the cycle or after a sudden stoppage in the middle of the cycle when the guide plate and the conical bottom of the chamber are full of material in bulk up to the inlet port of the discharge pipe.

Mixing of liquid and solid components in the abovedescribed method occurs at the phase boundary, namely between the bulk of the material being handled and the upper boundary of the starting portion of a high-velocity liquid flow moving helically within the chamber bottom around the rod towards the inlet port of the discharge pipe. Changes in density of slurry being conveyed occur at the end of the discharge cycle only when additional liquid under pressure is supplied to the phase boundary by seepage from the top part of the chamber, from the bypass pipe.

However, during conveyance of materials in bulk by liquid pressure through a large distance a high pressure and very high-velocity flow passes through the chamber so as to cause low densities of prepared and conveyed slurry even if they are constant similarly to a hydraulic elevator. Therefore, the abovedescribed method for conveying by liquid pressure ensures either an increased density of slurry or a large distance of conveyance with a low density.

With the material in bulk being washed off in a co-current flow, it is not possible to ensure homogenization of the material in bulk discharged from the chamber during the cycle so that the material is supplied into the conveying pipeline in the same order in which it was loaded into the chamber.

The provision of the bypass pipe, baffle plate and guide plate for changing direction for flow causes substantial head losses in the chamber which, for a given conveyance range, results in an increase in the pump power input and higher liquid velocity which negatively affects density of prepared and conveyed slurry. The movement of a two-phase flow (liquid and solid in bulk) along a helical path on the narrowing surface of the chamber bottom and about the rod also causes high additional resistance which negatively affects both density of slurry and overall energy consumption of the method as well.

Known in the art is also a method for conveying materials in bulk by liquid pressure (SU,A,1168496), comprising first loading a material in bulk into a chamber to fill it up and then supplying liquid under pressure in the form of a downward annular flow for discharging the material in bulk from the chamber in an upward flow passing inside the downward annular flow of liquid and conveying the material by liquid pressure.

Known in the art is an apparatus for conveying materials in bulk by liquid pressure (SU,A,1168496), comprising a chamber having a pipe for loading a material in bulk, an upright liquid draining pipe, a pipe for supplying liquid under pressure, and a pipe for discharging the material in bulk in an upward flow mounted coaxially with, and inside the pipe for supplying liquid under pressure.

Carrying out the discharge of the material in bulk in the upward flow in a direction opposite to the direction of liquid supply under pressure into the chamber allows the method to be carried out without clogging even upon a sudden stoppage of the pressure unit.

The discharge of the material in bulk in a strictly vertical flow ascending from the bottom part of the loaded chamber whereto the material in bulk is continually supplied under gravity makes it possible to increase density of prepared and conveyed slurry in comparison with the abovedescribed methods. However, mixing solid and liquid components by merely fluidizing the material in bulk and by pumping the resultant slurry under a gauge pressure cannot prevent density fluctuations because of non-uniformity of supply of the material in bulk to the bottom part of the chamber. In addition, density of the slurry being conveyed will also vary during the entire discharge cycle: it will have its maximum at starting with a certain decrease below the maximum value at the middle of the cycle while remaining almost unchanged and gradually decreasing to zero at the end of the cycle.

This arrangement of the pipes for liquid supply under pressure in a downward flow and for discharging a material in bulk ensures uniform supply of the material in bulk to the inlet port of the material discharge pipe in the zone therearound with a respective homogenization of the material in bulk during the discharge.

The abovementioned fluidization of the material occurs substantially over the whole space of the chamber so as to cause material head losses with a respective additional energy consumption.

In addition, pumping the slurry into the pipe for discharging the material in bulk in this method occurs in the direction opposite to the direction of liquid supply under pressure which also inevitably results in a higher specific energy consumption.

Summary of the Invention

It is an object of the invention to provide a method for conveying materials in bulk by liquid pressure which allows a 2-3-fold increase in density of prepared and conveyed slurry to be achieved without a decrease in conveyance range.

Another object of the invention is to provide an apparatus for conveying materials in bulk by liquid pressure which ensures a 2-3-fold increase in density of prepared and conveyed slurry without a decrease in conveyance range.

Still another object of the invention is to provide the possibility of controlling slurry density during conveyance by liquid pressure.

It is also an object of the invention to ensure homogenization of the material in bulk in respect of grading and substance composition during preparation and discharge of slurry.

Further object of the invention is to ensure minimum liquid head losses when liquid is supplied to the chamber for mixing liquid and solid components and for discharging slurry, hence, to optimize energy consumption.

These objects are accomplished by that in a method for conveying materials in bulk by liquid pressure, comprising loading a material in bulk into a chamber to fill it up and then supplying liquid under pressure in the form of a downward annular flow for discharging the material in bulk from the chamber in an upward flow passing inside the downward annular liquid flow, and conveying the material, according to the invention, a zone of recirculation flows of liquid supplied under pressure is formed in the chamber by swirling the downward annular flow to a degree determined by a ratio of the rotational component of velocity to the axial component of velocity at least equal to 0.4, the material in bulk being discharged in the zone of recirculation flows of liquid supplied under pressure.

It is preferred that in a method for conveying materials in bulk by liquid pressure according to the invention the size of the zone of recirculation flows of liquid supplied under pressure be controlled in a direction perpendicular to the direction of discharge of the material in bulk by varying pressure of liquid supplied to the chamber during the discharge to a value at which liquid velocity corresponds to $Re = 3.10^5$.

The above objects are also accomplished by that in an apparatus for conveying materials in bulk by liquid pressure, comprising a chamber having pipes for loading a material in bulk therein and for liquid draining, an upright pipe for supplying liquid under pressure in a downward flow, and a pipe for discharging the material in bulk in an upward flow mounted coaxially with, and inside the pipe for liquid supply, according to the invention, an inlet port of the pipe for supplying liquid under pressure in a downward flow is provided in the periphery thereof and has its axis offset with respect to the axis of the pipe for discharging the material in bulk in an upward flow for swirling a downward annular liquid flow in the space between the pipe for discharging the material in bulk in an upward flow and the pipe for supplying liquid under pressure in a downward flow with a preset flare angle of the swirled downward annular liquid flow at the end thereof on the side of an outlet port, an inlet port of the pipe for discharging the material in bulk in an upward flow being provided at one and the same level with an outlet port of the pipe for supplying liquid under pressure in a downward flow, below this level at any distance therefrom which is not greater than $h_1$ determined by the formula:

$$h_1 = \sqrt[3]{\frac{Q \cdot V \cdot \rho_w \cdot \cos\alpha}{0.6\pi \cdot g(\rho_s - \rho_w)}},$$

wherein Q is the flow of liquid supplied under pressure;

V is the velocity of the swirled downward annular flow of liquid in the space between the pipes for supplying liquid under pressure in a downward flow and for discharging the material in bulk in an upward flow;

$\rho_w$ is the density of liquid supplied under pressure;

$\rho_s$ is the density of the material in bulk;

$\alpha$ is the flare angle of the swirled downward annular flow of liquid;

g is the acceleration of gravity, or above this level at any distance therefrom which is not greater than $h_2$ determined by the formula:

$$h_2 = \frac{R}{\pi}\left[0.372 + 0.693\frac{R}{2l}\left(4\frac{l^2}{R^2} + 5\frac{l}{R} + 1\right) - \frac{R}{2l}\ln\frac{2R}{R - 2l} - \frac{2l}{R}\ln\frac{4l}{R - 2l}\right],$$

wherein R is the radius of the pipe for discharging the material in bulk in an upward flow;

l is the amount of space between the pipe for supplying liquid under pressure in a downward flow and for discharging the material in bulk in an upward flow.

The apparatus according to the invention preferable comprises a means for increasing the flare angle of the swirled downward annular flow of liquid provided at the end of one of pipes for supplying liquid under pressure in a downward flow and for discharging the material in bulk in an upward flow.

It is preferred that in an apparatus according to the invention the means for increasing the flare angle of the swirled downward annular flow of liquid be made in the form of a diffuser.

It is preferred that in an apparatus according to the invention the means for increasing the flare angle of the swirled downward annular flow of liquid be made in the form of a ring provided at the end of the pipe for discharging the material in bulk on the side of its inlet port.

The apparatus according to the invention preferably comprises a means for an additional swirling of the downward annular flow of liquid provided in the space between the pipes for supplying liquid under pressure in a downward flow and for discharging the material in bulk in an upward flow.

In an apparatus according to the invention the means for an additional swirling of the downward annular flow of liquid comprises a helical groove in the inner surface of the pipe for supplying liquid under pressure in a downward flow.

In an apparatus according to the invention the means for an additional swirling of the downward annular flow of liquid preferably comprises guide vanes rigidly secured to one of pipes for supplying liquid under pressure in a downward flow and for discharging the material in bulk in an upward flow.

It is preferred that an apparatus according to the invention comprise a mechanism for varying the relative position of the inlet and outlet ports of the pipes for discharging the material in bulk in an upward flow and for supplying liquid under pressure in a downward flow, the mechanism being linked with one of pipes for discharging the material in bulk in an upward flow and for supplying liquid under pressure in a downward flow.

The method for conveying materials in bulk by liquid pressure according to the invention allows the discharge of a solid material to be carried out reliably and without clogging in an upward flow and in a zone of countercurrent supply of liquid under pressure into the chamber of the apparatus.

This method makes it possible to achieve a 2-3-fold increase in density of prepared and conveyed slurry, first of all, owing to the fact that liquid and solid components are mixed in a zone of recirculation liquid flows formed by swirling a downward annular liquid flow which is characterized by high turbulence and which ensures a much higher intensity of mixing of liquid and solid components. The formation of this zone in the chamber provides for the creation of an area of lower velocities in the central part of the flow of liquid supplied under pressure, and the discharge of the material in bulk in this area prevents liquid supplied under pressure from spreading over the full space of the chamber so as to ensure the admission of the major bulk of liquid and material being handled to this area whereby mixing of the components is materially localized and accelerated.

Density of the prepared slurry during the discharge of the material in bulk from the chamber generally continually changes between maximum values and zero, but this change occurs in steps rather than gradually. In case of the upward flow discharge, this is caused by the fact that mixing of components carried out by merely fluidizing the material in bulk is accompanied by a regular separation of a large mass of fluidized material from the body of the mixture, the weight of the mass being sometimes greater than backpressure of liquid supplied to the chamber, and by the discharge of this mass alternating with the discharge of liquid batches. Density fluctuations are not very high, but they take place.

In the method according to the invention, owing to the presence of a local zone of recirculation flows, the process of discharge of the material in bulk is carried out continuously without density fluctuations of prepared slurry since separation of the material in bulk from the rest of the mixture occurs through separation of particles with highly-turbulent vortices of the local zone.

In addition, in carrying out the method, the material in bulk which is continually and gradually admitted to the zone of recirculation flows under gravity and hydrostatic pressure of the overlying liquid layers that displace the material in bulk ensures a more or less constant density of prepared slurry during the entire cycle with a decrease in density by the end of the cycle.

The method according to the invention makes it possible not only to increase density of prepared slurry without additional energy consumption, but also somewhat lowers power requirements for the discharge of the material in bulk from the chamber, other conditions being the same. The discharge is carried out in the area of lower velocities and with a backpressure from the zone of recirculation flows so as to lower the acting hydraulic resistance and to allow the range of conveyance by liquid pressure to be increased.

The method according to the invention, owing to the provision of the recirculation zone in which the discharge is carried out and which ensures a stable intensive mixing of solid and liquid components with highly-turbulent vortices in a local zone and uniform separation by the vortices of the material in bulk from the rest of the mixture on all sides allows a higher degree of homogenization of the material in bulk to be achieved during preparation of slurry and its discharge.

Controlling the size of the zone of recirculation flows by varying pressure of liquid supplied to the chamber in a direction perpendicular with respect to the direction of discharge of the material in bulk allows control of density of discharged and conveyed slurry to be effected to keep it constant up to the end of the cycle.

It should be noted that a swirled downward annular flow of liquid passing through a chamber generally undergoes a change in the initial ration of the rotational component of velocity to the axial component of velocity to a certain extent which at the boundary of the zone of recirculation flows should be at least equal to 0.4. With an increase in pressure of liquid being supplied this ratio will change, i.e. the flare angle of the swirled downward annular flow will increase with a respective increase in the width of the zone of recirculation flows and area of contact of the material in bulk with this zone. The process of entraining the material in bulk with highly-turbulent recirculation flows is thereby intensified to increase density of slurry being conveyed. The initial pressure of liquid supplied to the chamber is set up to be high enough to carry out discharge of the material in bulk and for conveying it to a desired range. An increase in the ratio of the rotational component of velocity to the axial component of velocity with an increase in pressure will occur to a certain limit characterized by obtaining a steady self-simulating mode of flow of the swirled downward annular flow of liquid in the chamber. This limit corresponds to a velocity of flow of liquid supplied to the chamber which corresponds to the Reynolds number $Re = 3.10^5$.

As the possibility of controlling density by varying liquid pressure is limited by the establishment of the self-simulating mode, the apparatus provides for controlling density over a wide range by varying the relative position of the inlet and outlet ports of the pipes for discharging the material in bulk and for supplying liquid under pressure in a downward flow within the boundaries of the zone of recirculation flows.

In addition, the apparatus features a simple construction so that it only takes to ensure a tangential or chordal supply of liquid to the space between the pipes for liquid supply under pressure in a downward flow and for discharging the material in bulk in an upward flow to increase density of prepared and conveyed slurry.

Positioning the pipe for discharging the material in bulk in an upward flow in the central part of the zone of recirculation flows which features lower velocities of liquid being supplied ensures swirling of the upward flow of slurry being discharged in the chamber upstream the inlet port of this pipe which also contributes to a reduction of head losses during the discharge and lowers overall energy consumption.

BRIEF DESCRIPTION OF THE DRAWINGS

The invention will now be described with reference to specific embodiments illustrated in the accompanying drawings, in which:

FIG. 7 is a general view, in a longitudinal section, of a discharge unit having a helical groove in the inner surface of a pipe for liquid supply with a decreasing pitch according to the invention;

FIG. 8 is ditto of FIG. 7, with a groove having a constant pitch in the lower part of the liquid supply pipe according to the invention;

DETAILED DESCRIPTION OF THE INVENTION

Figure 1:
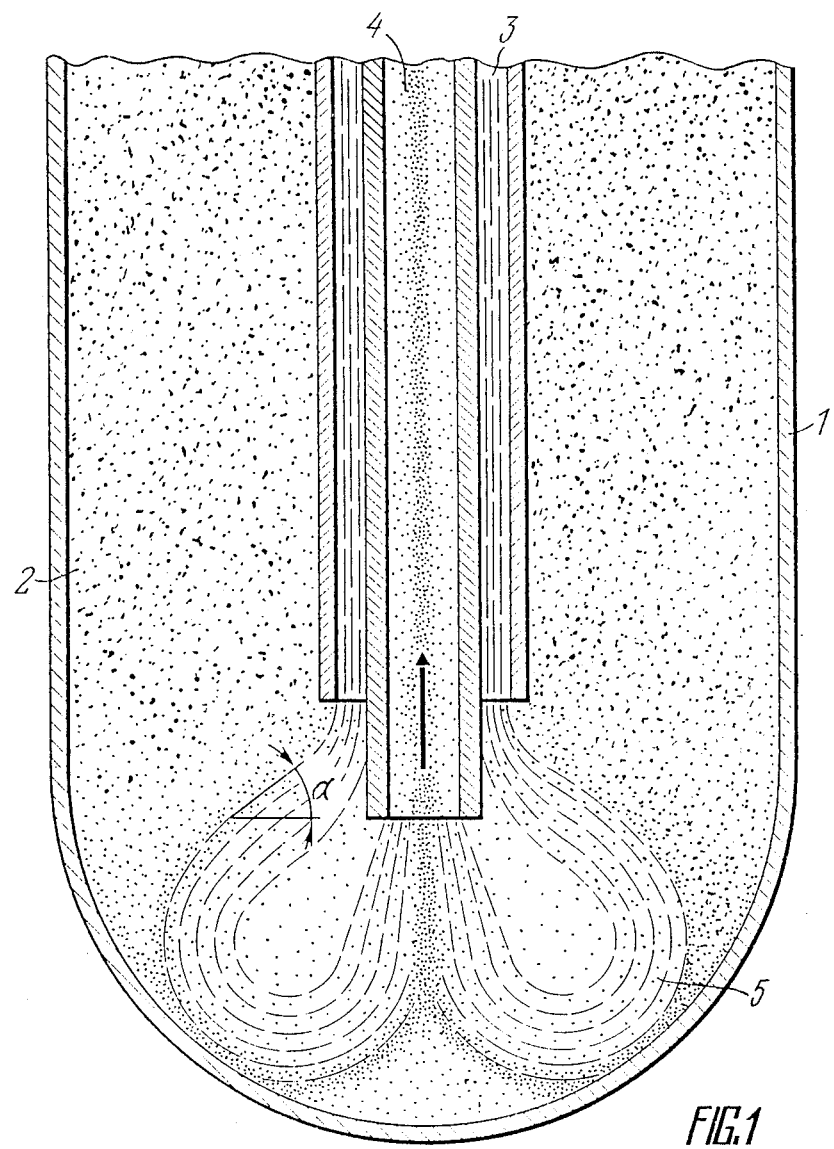
FIG. 1 schematically shows a partial view, in longitudinal section, of a chamber with a loading unit illustrating a method for conveying by liquid pressure according to the invention.

A method for conveying materials in bulk by liquid pressure comprises loading a chamber 1 (FIG. 1) with a material in bulk 2 to fill it up. The liquid in the form of a downward annular flow 3 is supplied to the chamber 1 under pressure thereby discharging the material in bulk from the chamber 1 in an upward flow 4 passing inside the downward annular liquid flow 3, with subsequent conveyance of the resultant slurry by liquid pressure.

To increase density of the slurry being conveyed, lower power requirements for mixing solid and liquid components and for discharging the slurry, and to enhance homogenization of the material in bulk during the discharge, a zone 5 of recirculation flows of liquid supplied under pressure is formed in the chamber 1, and for that purpose the downward annular liquid flow 3 is swirled to an extent determined by a ratio of the rotational component of velocity to the axial component of velocity at least equal to 0.4, the material in bulk 2 being discharged in the zone 5 of recirculation flows of liquid supplied under pressure.

To ensure the possibility of controlling density of prepared and conveyed slurry so as to prevent density from decreasing at the end of the cycle, the size of the zone 5 of recirculation flows of liquid supplied under pressure is controlled in a direction perpendicular with respect to the direction of discharge of the material in bulk, and for that purpose pressure of liquid supplied to the chamber is varied from the initial value to a value at which velocity of liquid supplied to the chamber corresponds to the Reynolds number $Re = 3.10^5$.

An apparatus for conveying materials in bulk by liquid pressure has the chamber 1 (FIG. 2) that may have any desired configuration. It may be spherical, cylindrical, toroidal, and the like. One of the most advantageous configurations of the chamber to carry out the method is the toroidal configuration with vertical cylindrical peripheral portions. The chamber 1 has in the top part thereof a pipe 6 for loading the material in bulk which may be in the form of a loading pipeline for loading the material in bulk in the form of slurry or in the form of a loading hopper having a gate for supplying a dry material in bulk to the chamber 1. The chamber also has a liquid draining pipe 7 for draining process water displaced during loading. In this embodiment, the pipes 6,7 are integrated to form a loading unit 8 so as to enhance structural strength of the chamber 1 and to increase conveyance range as well as to minimize losses of the material in bulk during loading. The pipe 7 is provided with a sealing member 9 mounted at the end thereof outside the chamber 1, and the pipe 6 for loading the material in bulk is installed in the sealing member. The chamber 1 has a discharge unit 10 consisting of two coaxially extending upright pipes 11, 12 for liquid supply under pressure in a downward flow and for discharging the material in bulk in an upward flow, respectively. The discharge unit 10 may be provided both in the bottom part of the chamber 1 if it is toroidal with the vertical cylindrical peripheral portions, the discharge unit 10 being provided therebetween at the upper point of the axis of symmetry of the toroidal portion, and in the top part of the chamber 1. The pipe 11 for liquid supply under pressure in a downward flow has a sealing member 13 provided at the end thereof outside the chamber 1, and the pipe 12 for discharging the material in bulk in an upward flow is mounted in this sealing member. An inlet port 14 (FIG. 3) of the pipe 11 is provided in its periphery below the sealing member 13 (FIG. 2) outside the chamber 1. To ensure swirling of the downward annular flow 3 of liquid (FIG. 1) in the space between the pipes 11 and 12 to an extent depending on a ratio of the rotational component of velocity to the axial component of velocity at an outlet of the pipe 11 which is at least equal to 0.4 and which determines the flare angle α (FIG. 1) of the swirled downward annular flow 3 of liquid, the axis 0 (FIG. 3) of the port 14 is offset with respect to the axis 0' of the pipe 12 in such a manner that the admission of liquid under pressure to the space between the pipes 11, 12 (FIG. 2) occurs either tangentially of chordally so as to ensure a certain ratio of the rotational component of velocity to the axial component of velocity.

With this construction of the discharge unit 10, the pipes 11, 12 have different lengths of their portions extending inside the chamber 1. To increase density of prepared and conveyed slurry and to carry out the discharge of the material in bulk in the zone 5 of recirculation flows of liquid supplied under pressure (FIG. 1), the inlet port 14 (FIG. 3) of the pipe 12 for discharging the material in bulk in an upward flow is located at one and the same level with the outlet port of the pipe 11 (FIG. 2) for supplying liquid under pressure in a downward flow, below this level at any distance therefrom which is not greater than $h_1$ determined from the formula:

$$h_1 = \sqrt[3]{\frac{Q \cdot V \rho_w \cos\alpha}{0.6\pi \cdot g(\rho_s - \rho_w)}} \quad (1)$$

wherein
Q is the flow of liquid supplied under pressure;
V is the velocity of the swirled downward annular flow 3 of liquid in the space between the pipes 11, 12 for supplying liquid under pressure in a downward flow and for discharging the material in bulk in an upward flow;
$\rho_w$ is the density of liquid supplied under pressure;
$\rho_s$ is the density of the material in bulk 2; is the flare angle of the downward annular swirled flow 3 of liquid;
g is the acceleration of gravity,
or above this level at any distance therefrom that is not greater than $h_2$ determined from the formula:

$$h_2 = \frac{R}{\pi}\left[0.372 + 0.693\frac{R}{2l}\left(4\frac{l^2}{R^2} + 5\frac{l}{R} + 1\right) - \frac{R}{2l}\ln\frac{2R}{R-2l} - \frac{2l}{R}\ln\frac{4l}{R-2l}\right] \quad (2)$$

wherein
R is the radius of the pipe 12 for discharging the material in bulk in an upward flow;
l is the amount of space between the pipes 11, 12 for supplying liquid under pressure in a downward flow and for discharging the material in bulk in an upward flow.

The value of the distance $h_1$ is determined by condition that the inlet port of the pipe 12 be located in the zone 5 (FIG. 1) of recirculation flows and by a special character of the action of a constrained submerged jet and by the radius of curvature of the zone 5. The distance $h_2$ determines position of the free boundary of the submerged jet in the chamber 1 in which all flow of liquid supplied under pressure is admitted to the inlet port of the pipe 12 (FIG. 2) without entraining the material in bulk.

Figure 4:
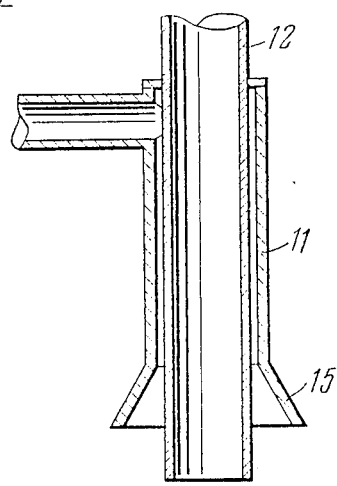
FIG. 4 is a general view, in longitudinal section, of a discharge unit having a diffuser provided at the end of a pipe for liquid supply.
Figure 5:
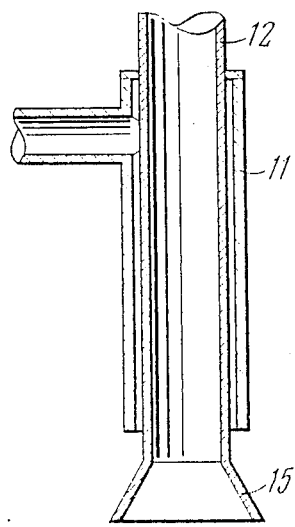
FIG. 5 is ditto of FIG. 4, but with a diffuser provided at the end of a pipe for discharging a material in bulk.

To achieve an additional increase in density of the prepared and conveyed slurry, the apparatus comprises a means for increasing the flare angle of the swirled downward annular flow of liquid provided at the end of one of pipes 11, 12 for liquid supply and for discharge of the material in bulk. In the embodiment shown in FIG. 4 this means comprises a diffuser 15 provided at the end of the liquid supply pipe 11. In the embodiment shown in FIG. 5 the diffuser 15 is provided at the end of the pipe 12 for discharging the material in bulk.

Dimensions and angle of the diffuser 15 are determined by the desired flare angle α of the swirled downward annular flow 3 of liquid in the chamber 1 (FIG. 1).

Figure 6:
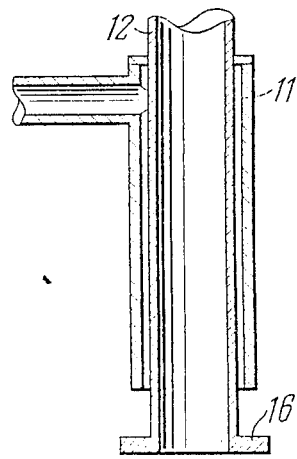
FIG. 6 is ditto of FIG. 5, but with a ring provided at the end of a pipe for discharging a material in bulk.

In the embodiment shown in FIG. 6, said means comprises a ring 16 provided at the end of the pipe 12 for discharging the material in bulk.

The ring 16 is designed for deflecting an additional part of the swirled downward flow 3 (FIG. 1) passing adjacent to the pipe 12 (FIG. 6) and for increasing the flare angle α (FIG. 1) of the swirled flow in the chamber 1.

The use of both the diffuser 15 (FIGS. 4,5) and the ring 16 (FIG. 6) allows the zone 5 of recirculation flows of liquid in the chamber 1 (FIG. 1) and the area of contact between the material in bulk and highly-turbulent vortices in the zone 5 to be enlarged, with a respective increase in density of the prepared and conveyed slurry.

Figure 2:
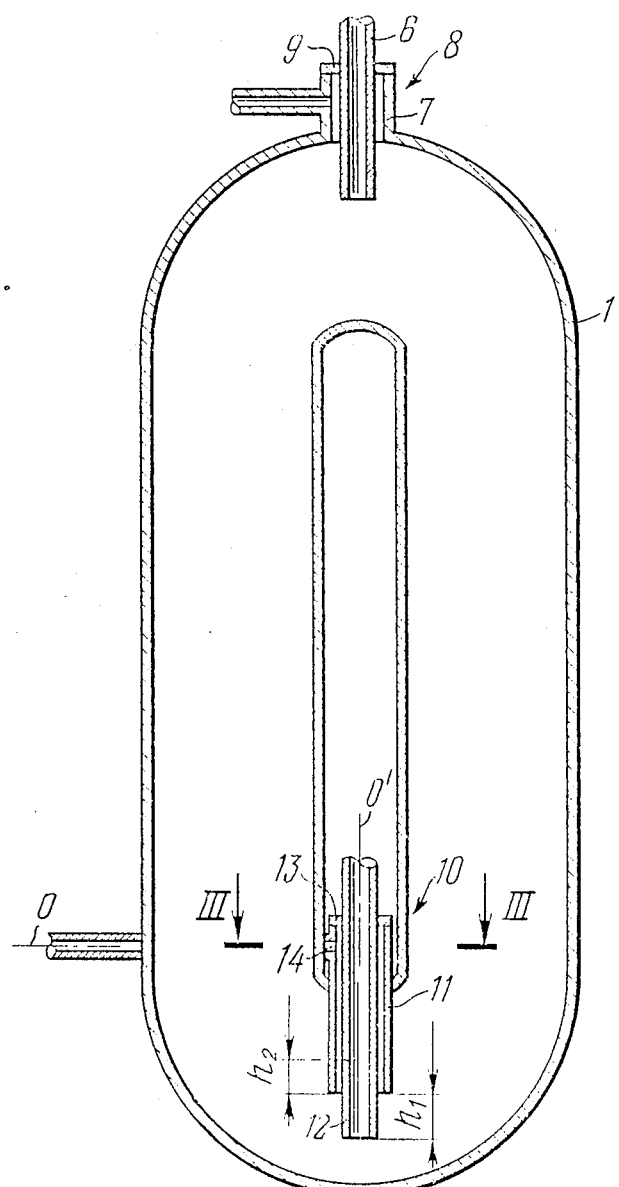
FIG. 2 is a general view, in longitudinal section, of a chamber showing discharge and loading units according to the invention.
Figure 3:
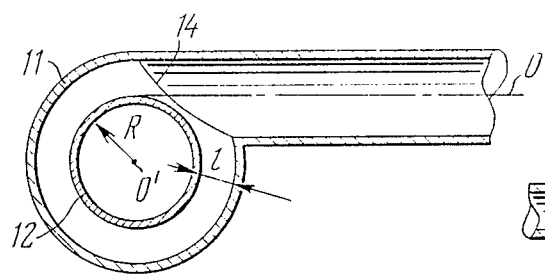
FIG. 3 is a sectional view taken along line III—III in FIG. 2.

To achieve a higher density of the prepared and conveyed slurry and also to ensure a desired ratio of the rotational component of velocity to the axial component of velocity at the outlet of the pipe 11 (FIG. 2) in case the offset of the axis 0 (FIG. 3) of the port 14 with respect to the axis 0' of the pipe 12 cannot bring about such an increase, a means for an additional swirling of the downward annular flow of liquid is provided in the space between the pipes 11 and 12 (FIG. 2). The means for an additional swirling of the downward annular flow in the embodiment shown in FIGS. 7,8 comprises helical grooves 17,17' with a pitch b in the inner surface of the pipe 11. The groove 17 (FIG. 7) extends along the whole length of the pipe 11 with a gradual decrease in the pitch b in the direction towards the outlet port, and the groove 17' (FIG. 8) is made in the bottom part of the pipe 11 adjacent to the outlet port thereof and has a constant pitch b. This construction results in an increase in density of prepared and conveyed slurry owing to an increase in the ratio of the rotational component of velocity to the axial component of velocity of liquid supplied under pressure to the axial component of velocity ensured by the abovementioned position of the port 14 (FIG. 3) with respect to the axis 0' of the pipe 12 with a respective increase in the flare angle α of the swirled downward annular flow 3 in the chamber 1.

The additional swirling of liquid substantially increases turbulization of recirculation flows in the zone 5 and results in a higher degree of saturation of liquid with the material in bulk.

Figure 9:
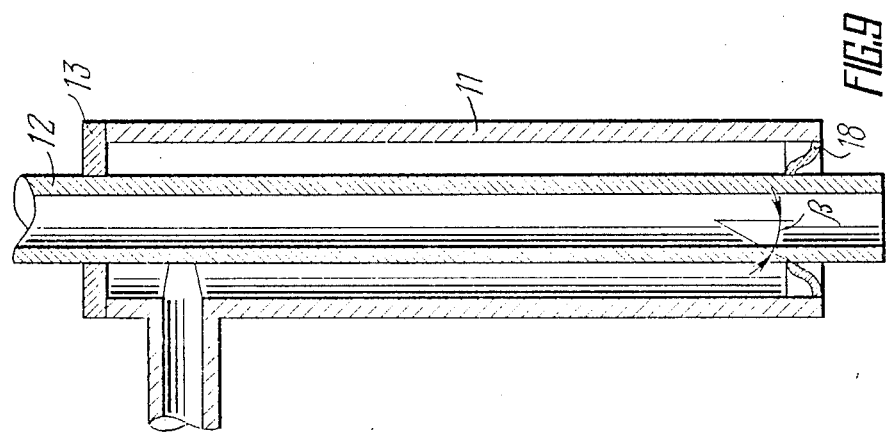
FIG. 9 is ditto of FIG. 7, with guide vanes provided on a liquid supply pipe according to the invention.

The means for an additional swirling of the downward annular flow of liquid in the embodiment shown in FIG. 9 comprises guide vanes 18 rigidly secured to one of the pipes 11, 12. The vanes 18 have curved helical surfaces (similarly to a propeller), the angle of curvature of their surfaces determining, first of all, the value of additional hydraulic resistance appearing in the space between the pipes 11, 12 with the provision of the guide vanes 18 and to a certain extent a change in the ratio of the rotational component of velocity to the axial component of velocity.

The angle of curvature of the helical surface of the guide vanes 18 is determined to comply with the condition of minimizing the additional hydraulic resistance in the space between the pipes 11, 12. In this embodiment the angle of curvature is between 8° and 15°. The width of the guide vanes 18 is about equal to the amount of space between the pipes 11, 12. To achieve the maximum swirling effect and to increase the flare angle α (FIG. 1) of the swirled downward annular flow of liquid 3 at the outlet of the pipe 11 (FIG. 9), the guide vanes 18 are provided on one of pipes 11, 12 adjacent to the outlet port of the pipe 11 at an angle β with respect to the axis of the pipe. The angle of inclination of the guide vanes 18 is determined by the need to ensure a certain ratio of the rotational component of velocity to the axial component of velocity of the flow of liquid supplied under pressure, and this angle is between 60° and 30° in this embodiment, depending on kind of a material in bulk being handled.

The guide vanes 18 are provided in an equally spaced relation to one another over the entire crosssection of the space between the pipes 11, 12. The number of the vanes depends on the need to obtain a certain flare angle of the swirled downward annular flow of liquid at the outlet of the pipe 11. It has been found that for the construction of the apparatus described herein, with guide vanes 18 mounted at an angle β of 45° with respect to the axis of the pipes 11, 12, the guide vanes 18 cover more than 50% of the live cross-section of the space between the pipes 11, 12 so that they cannot bring about any remarkable increase in slurry density. The best result was achieved with six vanes 18. Therefore, with the provision of the grooves 17 (FIG. 7), 17' (FIG. 8) or vanes 18 (FIG. 9), the size of the zone 5 (FIG. 1) of recirculation flows increases to enhance turbulization of the recirculation flows, and an increase in the area of contact between the material in bulk 2 and the highly-turbulent vortices in the zone 5 of recirculation flows of liquid ensures a high degree of intensification of mixing of solid and liquid components with a respective increase in density of prepared and conveyed slurry.

Figure 10:
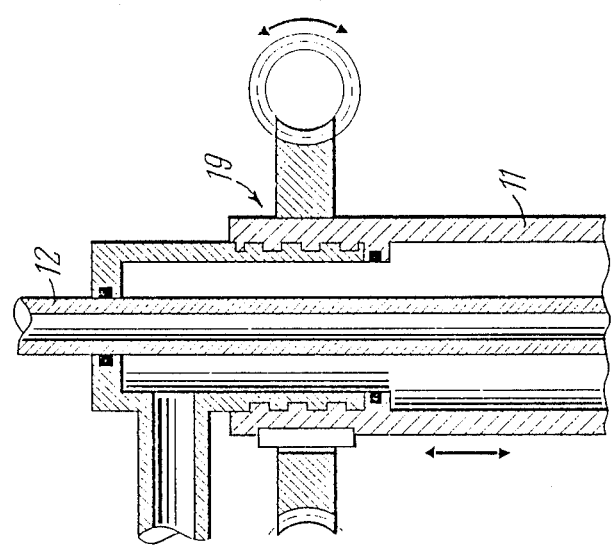
FIG. 10 is a partial general view, in longitudinal section, of a discharge unit having a mechanism for reciprocating a liquid supply pipe according to the invention.

To ensure control of density of prepared and conveyed slurry at the end of the discharge cycle by varying the relative position of the outlet port of the pipe 11 (FIG. 2) and the inlet port of the pipe 11, one of pipes 11, 12 is connected to a mechanism 19 (FIG. 10) for varying the relative position of the inlet and outlet ports of the pipes for discharging the material in bulk in an upward flow and for supplying liquid under pressure in a downward flow. In this embodiment, the mechanism 19 ensures axial movement of the pipe 11 along the pipe 12 and comprises a widely known cam mechanism. The mechanism 19 ensures movement within the limits of the abovedescribed distances $h_1$ and $h_2$ between the outlet port of the pipe 11 and the inlet port of the pipe 12. A change in their relative position determines the point of discharge of the material in bulk from the chamber 1 (FIG. 1) in the form of slurry within the zone 5 of recirculation flows. It should be noted that the lower the position of the inlet port of the pipe 12 at the end of the cycle with a small quantity of the material in bulk available in the chamber 1, the higher is the degree of saturation of the recirculation flows in the zone 5 with the material in bulk and the lower is a change in density of prepared and conveyed slurry.

Figure 11:
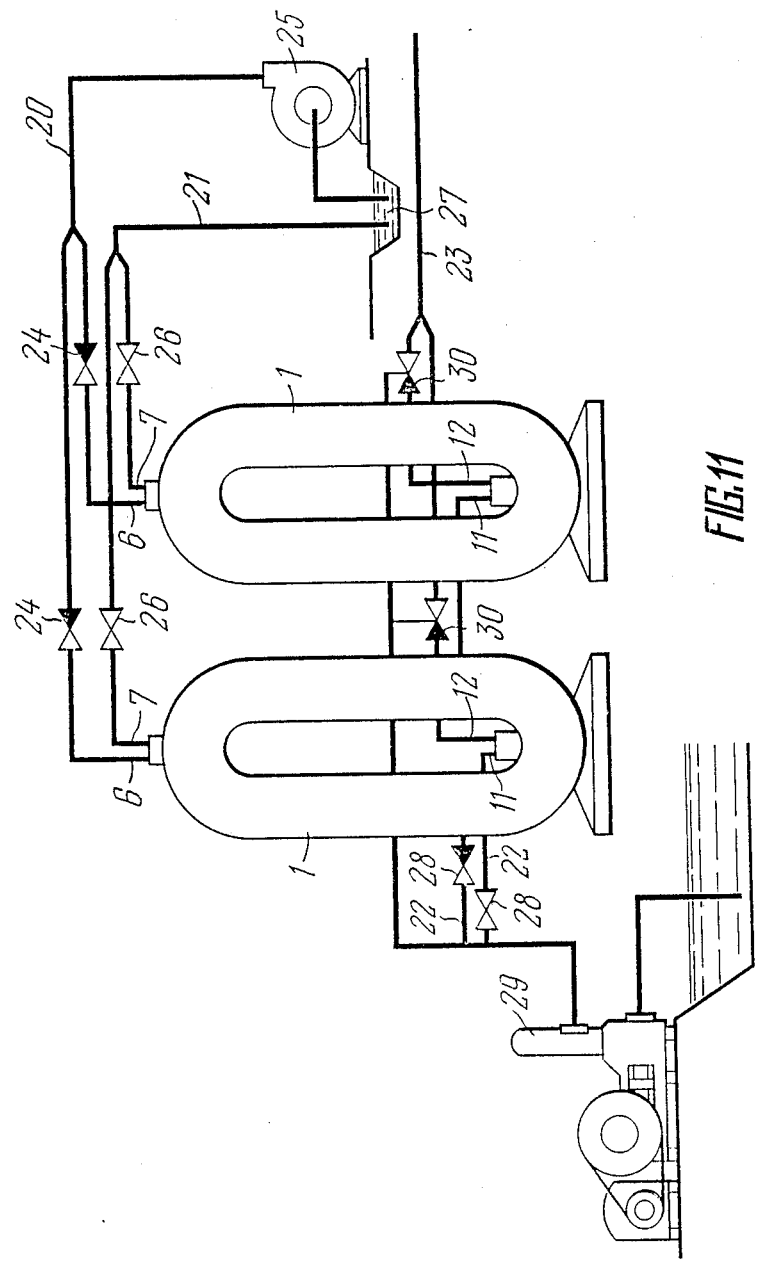
FIG. 11 schematically shows a general view of a plant for conveying materials in bulk by liquid pressure incorporating two apparatuses for conveyance by liquid pressure.

The pipes 6, 7, 11, 12 (FIG. 11) are connected to a slurry supply pipeline 20, drain pipeline 21, pressure water supply pipeline 22, and conveying pipeline 23, respectively.

The apparatus for conveying materials in bulk by liquid pressure is part of a plant for conveying materials in bulk by liquid pressure. For operation on a continuous basis, this plant comprises a pair of such apparatuses or even more, each communicating, through the slurry supply pipeline 20 having a built-in check valve 24, with a low pressure slurry pump 25 and, via the drain pipeline 21 having a gate 26, with a sump pit 27 of the low-pressure slurry pump 25 to avoid eventual losses of the material in bulk, and, via the pressure water supply pipeline 22 having a built-in gate 28, with a high-pressure water pump 29, and also communicates with the conveyance pipeline 23 having a check valve 30.

The apparatus for conveying materials in bulk by liquid pressure functions in the following manner. The material in bulk in the form of slurry is loaded by means of the low-pressure slurry pump 25 (FIG. 11) into the chamber 1 filled with liquid replacing the material in bulk that has been conveyed during the foregoing cycle before filling up the chamber. The material in bulk is stored under gravity in the chamber 1 to displace the liquid available in the chamber through the drain pipe 7 and drain pipeline 21 to the sump pit 27. The material in bulk is loaded into the chamber 1 (FIG. 2) to a level of the outlet port of the loading pipe 6. When the loading cycle is over, the pipes 7 and 6 are shut off by the checkvalve 24 (FIG. 11) and gate 26, respectively, and liquid is supplied by the high-pressure water pump 29 through the pressure pipeline 22 and the inlet port 14 (FIG. 3) of the pipe 11 for liquid supply under pressure in a downward flow to the space between the pipes 11, 12 so as to swirl the annular flow 3 of liquid (FIG. 1). A certain ratio of diameters of the pipes 11, 12 (FIG. 3) and the amount of space 1 therebetween ensures, with the tangential or chordal addmission of liquid, a flare angle α of the flow at the outlet of the pipe 11 which is determined by a ratio of the rotational component of velocity to the axial component of velocity at least equal to 0.4 so as to form the zone 5 of recirculation flows. The provision of the zone 5 of recirculation flows at the outlet of the pipe 11 (FIG. 2) results in high flow velocities at the boundary of flare-up of the swirled downward annular flow of liquid in the chamber 1 (FIG. 1) and in the formation of an area of low velocities or an area of countercurrent in the central part of the flow 3 so as to bring about a substantial localization of the zone 5. The slurry is discharged in the central part of the zone 5 of recirculation flows of liquid through the pipe 11 (FIG. 2) for discharging the slurry in an upward flow so as to ensure the admission of the major bulk of the liquid being supplied to the inlet port of the pipe 11 rather than movement of the liquid over the entire space of the chamber 1. Density of prepared and conveyed slurry is thereby increased by a factor of 2 to 3 owing to the intensification of mixing of liquid and solid components in the locallized zone 5 of recirculation liquid flows (FIG. 1) since separation and removal of the material in bulk 2 from the rest of the mixture available in the chamber 1 occurs at a high velocity with highly-turbulent vortices of liquid in the zone 5 which are directed towards the inlet port of the pipe 12 (FIG. 2).

It is known that the material in bulk 2 (FIG. 1) is conveyed by liquid pressure in the upward flow 4 in the form of a swirled flow, with the major body of the material 2 being concentrated in the central part of the flow 4. Therefore the discharge is generally accompanied by additional head losses for the formation of such a flow in pipes or pipelines. The zone 5 of recirculation liquid flows formed in the chamber 1 during the discharge of the material in bulk in the central part of this zone 5 ensures formation of the swirled upward flow 4 of slurry with a high concentration of the material in bulk already within the chamber 1 and directly upstream the inlet port of the pipe 12 (FIG. 2) which, with the coaxial position of the pipes 11, 12, minimizes hydraulic resistance in the pipe 12. It should be noted that slurry is not discharged in a direction opposite to that in which liquid is supplied under pressure, but rather in the area of lower velocities or countercurrents which also contributes to lowering of power requirements for conveying the material in bulk by liquid pressure. During the discharge, the material in bulk 2 (FIG. 1) gradually moves down without bridging and is uniformly entrained on all sides with highly-turbulent vortices of the zone 5 of recirculation flows to be intensively mixed therein so as to ensure homogenization of the material in bulk in respect of grading and substance composition in carrying out the method according to the invention.

Therefore, owing to the intensive mixing of liquid and solid components with highly-turbulent vortices of the zone 5 of recirculation flows, a slurry having a constant density during almost the entire discharge cycle period is prepared and conveyed. It should be noted that at the end of the cycle, when pressure of the material in bulk and liquid layers above the zone 5 is substantially lower than those at the beginning of the cycle, slurry density gradually decreases to zero. To keep slurry density at one and the same level during the entire cycle, the flare angle $\alpha$ of the swirled downward annular flow 3 of liquid at the outlet of the pipe 11 (FIG. 2) and, respectively, the size of the zone 5 of recirculation flows (FIG. 1) are varied, and for that purpose, pressure of liquid supplied to the chamber 1 during the discharge is varied. Consequently, at the end of the cycle, pressure is raised with a respective increase in the size of the zone 5 so that, in the end of the day, area of contact of the highly-turbulent vortices with the material in bulk 2 increases and degree of their saturation with the material in bulk also increases owing to a decrease in the velocity of vortices admission directly to the inlet port of the pipe 12 (FIG. 2). A change in the initially set ratio of the rotational component of velocity to the axial component of velocity occurs as a result of hydraulic resistances in the space between the pipes 11, 12 during the passage of the swirled liquid flow therein. With an increase in the flow velocity upon a pressure increase, the effect of roughness of the walls of the pipes 11, 12 on the change in the ratio of the rotational component of velocity to the axial component of velocity decreases. With velocities corresponding to, or higher than those corresponding to the Reynolds number $Re = 3.10^5$ in the port 14 (FIG. 3), this ratio will remain unchanged upon a pressure increase since hydraulic resistance in the space will no longer affect the flare angle $\alpha$ (FIG. 1) of the swirled flow, and a self-simulating flow mode will obtain.

To ensure an additional increase in density of slurry, the means for increasing the flare angle of the swirled annular liquid flow is provided at the end of the pipes 11, 12 (FIG. 2). Thus, this means comprising the diffuser 15 (FIG. 4) is provided at the end of the pipe 11 for supplying liquid under pressure in a downward flow. The swirled annular flow has a larger flare angle at the outlet of the diffuser 15, but the velocity of swirling of the flow decreases as a whole, and the differential of velocities between the boundary of the flow and the central part thereof decreases with a respective reduction of the velocity of removal of the material in bulk from the chamber 1 (FIG. 1) so as to impair conditions for preparing an upward flow of slurry in the chamber. Therefore, a certain increase in density of prepared slurry is achieved with a low intensity of mixing of liquid and solid components owing to a larger area of contact between the zone 5 of recirculation flows of liquid and material in bulk. By providing the diffuser 15 (FIG. 5) at the end of the pipe 12 on the side of its inlet port, the flare angle $\alpha$ of the swirled downward annular flow 3 (FIG. 1) and the width of the zone 5 of the recirculation flows are increased thereby enhancing the density of slurry being conveyed. The provision of the diffuser 15 at the end of the pipe 12 affects the velocity differential at the inlet port thereof to a smaller extent with a lower effect on formation of the upward flow of the material in bulk being discharged adjacent to the inlet port of the pipe 12.

A higher density of slurry may be achieved by changing the flare angle of the swirled downward flow if the ring 16 (FIG. 6) is provided at the end of the pipe 12 on the side of its inlet port without changing intensity of mixing of liquid and solid components. However, the provision of the ring 16 causes additional hydraulic resistances which brings about an increase in overall power requirements for the conveyance by liquid pressure.

Density of slurry is increased by intensifying mixing of liquid and solid components simultaneously with an increase in size of the zone 5 of recirculation flows (FIG. 1), and for that purpose the means for an additional swirling of the downward annular liquid flow is provided in the space between the pipes 11, 12 (FIG. 2). Thus, the means for an additional swirling may be, e.g. in the form of the helical grooves 17, 17' (FIGS. 7,8) in the inner surface of the pipe 11 having a pitch b. The helical groove 17 (FIG. 7) extends along the whole length of the pipe 11 with a pitch b decreasing in the direction towards the outlet port of the pipe 11, and the groove 17' (FIG. 8) extends in the lower part of the pipe 11 and has a constant pitch b. These options are determined by length and dimensions of the pipes 11, 12 and by a manufacturing process available. The pitch b determines the degree of change in the ratio of the rotational component of velocity to the axial component of velocity during passage of the swirled downward flow through the space between the pipes. It should be noted that not only is a larger flare angle $\alpha$ (FIG. 1) of the swirled flow obtained at the outlet of the pipe 11, but the degree of turbulization of the recirculation flows is substantially higher. This materially intensifies mixing of the material in bulk and contributes to a greater extent to the formation of a high-density upward flow of slurry in the chamber with a respective lowering of power requirements.

With a large space between the pipes 11 and 12 (FIG. 2) and with a high liquid flow, the means for an additional swirling comprises the guide vanes 18 (FIG. 9) rigidly secured to one of pipes 11, 12. The additional swirling ensures maximum increase in turbulence of the flow of liquid supplied to the chamber 1 (FIG. 2) and maximum intensity of mixing of liquid and solid components. However, the separation of the downward annular flow 3 of liquid (FIG. 1) during passage through the vanes 18 (FIG. 9) into individual flows and the provision of the vanes 18 in the space between the pipes 11 and 12 cause additional hydraulic resistances at the admission of liquid to the chamber 1 (FIG. 2) which negatively affects overall power requirements of the method of conveying the material in bulk by liquid pressure.

In applications where it is not possible to control density of slurry within the abovementioned velocity range because of conveyance conditions (with high flow and pressure parameters of operation of the apparatus with a long-range conveyance), control is effected by varying the relative position of the inlet and outlet ports of the pipes 12 and 11 (FIG. 10) for discharging the material in bulk in an upward flow and for supplying liquid under pressure in a downward flow. For that purpose, the mechanism 19 is provided at one end of the pipe 11 or 12, and in this specific embodiment the mechanism 19 is provided on the pipe 11. For varying the relative position of the outlet and inlet ports of the pipes 11, 12 by axially reciprocating one of them, the mechanism 19 may be in the form of a conventional cam mechanism provided on the pipe 11. If the outlet port of the pipe 11 is moved up at the end of the cycle, the velocity differential of the swirled downward annular flow supplied in the area of the inlet port of the pipe 12 decreases with a respective increase in duration of the period during which the recirculation flows of liquid are saturated with the material in bulk before the upward slurry flow is formed, and slurry density increases. The mechanism 19 may also comprise tips on the ends of the pipes 11, 12 moved by hydraulic cylinders.

The method and apparatus for conveying materials by liquid pressure according to the invention feature reliability in operation and simple structure and allows density of prepared and conveyed slurry to be increased by a factor of 2 to 3 without decreasing the conveyance range and with optimum power requirements.

For example, with swirling of a downward annular flow of liquid to an extent determined by a ratio of the rotational component of velocity to the axial component of velocity between 0.78 and 1.8 density of prepared and conveyed slurry conveyed through a distance of 6 to 8 km and containing a material in bulk having a specific gravity of 2.7–2.8 t/m$^3$ ranged from 1.28 to 1.43 t/m$^3$ for different discharge unit designs. Maximum density was obtained in using the guide vanes mounted at the angle $\beta=30°$. With the angle $\beta=45°$, density of slurry being conveyed was as high as 1.53 t/m$^3$, but a substantial pressure decrease occurred in the discharge unit (about 5%). In another embodiment, with the throughput capacity of 300 m$^3$/h when the same material was conveyed through a distance of 3 km, velocity of flow of liquid supplied under pressure was characterized by the Reynolds number $Re=5.3.10^5$ so that density in this case was controlled by means of the reciprocating mechanism for moving the pipe for supplying liquid under pressure in a downward flow.

Figure 12:
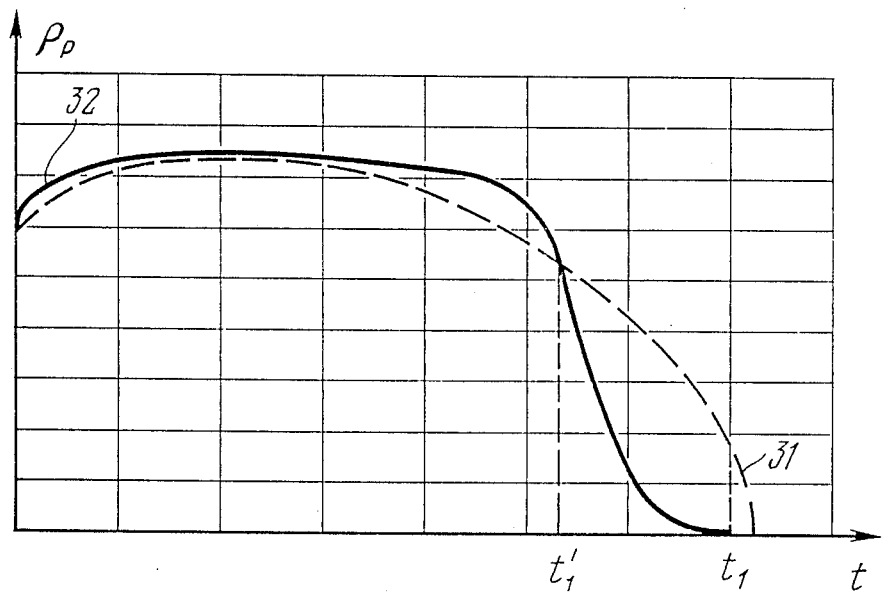
FIG. 12 shows slurry density versus time during the discharge cycle for a single chamber.

For a better understanding of the method for conveying material in bulk by liquid pressure, FIG. 12 shows density of slurry versus time during the discharge cycle for a single chamber, in which time in seconds is plotted on the abscissae and density $\rho_p$ in kg/m$^3$ is plotted on the ordinates.

A gradual decrease in density of slurry being conveyed shown in FIG. 12, curve 31, occurred beginning from about the middle of the cycle with a sudden decrease at the moment $t_1$. When the pipes were moved, the density of slurry prepared and conveyed by the apparatus remained substantially unchanged during the last one-fifth of the entire cycle (curve 32). Therefore, with the utilization of the substantially all useful space of the chamber, the discharge cycle was interrupted at the moment $t_1'$ of a material decrease in density, and a change-over was carried out from one chamber 1 (FIG. 11) to the other in the working mode so as to guarantee a constant density versus time.

The use of the method according to the invention allows a material in bulk to be homogenized in respect of grading and substance composition, and the employment of the apparatus according to the invention minimizes head losses for mixing liquid and solid components and for the discharge of slurry in an upward flow.

We claim:

1. A method for conveying materials in bulk by liquid pressure, comprising the steps of:

loading a material in bulk into a chamber to fill it up;

supplying to the chamber liquid under pressure in the form of a downward annular flow for discharging the material in bulk from the chamber in an upward flow passing inside said downward annular flow of liquid and conveying the material in bulk by liquid pressure;

forming in the chamber a zone of recirculation flows of liquid supplied under pressure by swirling said downward annular liquid flow to an extent determined by a ratio of the rotational component of velocity to the axial component of velocity which is at least equal to 0.4;

carrying out said discharge of the material in bulk in said zone of recirculation flows of liquid supplied under pressure.

2. A method for conveying by liquid pressure according to claim 1, comprising:

controlling the size of said zone of recirculation flows of liquid supplied under pressure in a direction perpendicular to the direction of said discharge of the material in bulk by varying pressure of liquid supplied to the chamber during said discharge to a value at which velocity of liquid corresponds to $RE=3.10^5$.

3. An apparatus for conveying materials in bulk by liquid pressure, comprising:

a chamber for forming a mixture of a material in bulk and liquid therein for subsequent conveyance by liquid pressure;

a pipe for loading the material in bulk through which said chamber is filled up with the material in bulk;

a pipe for liquid draining through which liquid displaced by the material in bulk is removed from said chamber;

an upright pipe for supplying liquid under pressure in a downward flow through which liquid under pressure is supplied to said chamber for washing the material in bulk with the formation of a slurry, the pipe having a periphery, an inlet port, and an outlet port;

a pipe for discharging the material in bulk in an upward flow mounted to extend coaxially with, and inside said pipe for supplying liquid under pressure in a downward flow, the resultant slurry being removed and conveyed by liquid pressure through this pipe;

an annular space between said pipes for supplying liquid and for discharging slurry, respectively;

said inlet port of said pipe for supplying liquid under pressure being provided in said periphery thereof and having its axis offset with respect to the axis of said pipe for discharging the material in bulk for swirling the downward annular flow of liquid in said space between said pipes for liquid supply and slurry discharge with a predetermined flare angle of the swirled downward annular flow of liquid at the end thereof on the side of said outlet port;

the inlet port of said pipe for discharging the material in bulk being located at one of levels with respect to said outlet port of said pipe for supplying liquid under pressure ranging from a lower level to an upper level, wherein the lower level is located below the level of said outlet port of said pipe for supplying liquid under pressure at a distance therefrom which is not greater than $h_1$ determined from the formula:

$$h_1 = \sqrt[3]{\frac{Q \cdot V \cdot \rho_w \cdot \cos\alpha}{0.6\pi \cdot g \cdot (\rho_s - \rho_w)}},$$

wherein

Q is the flow of liquid supplied under pressure;

V is the velocity of the swirled downward annular flow of liquid in the space between the pipes for supplying liquid under pressure in a downward flow and for discharging the material in bulk in an upward flow;

$\rho_w$ is the density of liquid supplied under pressure;

$\rho_s$ is the density of the material in bulk;

$\alpha$ is the flare angle of the swirled downward annular flow of liquid;

g is the acceleration of gravity, and the upper level is located above the level of said outlet port of said pipe for supplying liquid under pressure at a distance therefrom which is not greater than $h_2$ determined from the formula:

$$h_2 = \frac{R}{\pi}\left[0.372 + 0.693 \frac{R}{2l}\left(4\frac{l^2}{R^2} + 5\frac{l}{R} + 1\right) - \frac{R}{2l}\ln\frac{2R}{R\,2l} - \frac{2l}{R}\ln\frac{4l}{R - 2l}\right],$$

wherein R is the radius of said pipe for discharging the material in bulk;

l is the amount of said space between said pipes for supplying liquid and for discharging the material in bulk.

4. An apparatus according to claim 3, comprising:
a means for increasing the flare angle of the swirled downward annular flow of liquid provided at the end of one of said pipes for liquid supply and for discharging the material in bulk on the side of said outlet and inlet port, respectively.

5. An apparatus according to claim 3, comprising:
a means for an additional swirling of the downward annular flow of liquid provided in said space between said pipes for supplying liquid and for discharging the material in bulk designed to increase the ratio of the rotational component of velocity to the axial component of velocity.

6. An apparatus according to claim 3, comprising:
a mechanism for varying the relative position of said inlet and outlet ports of said pipes for discharging the material in bulk and for liquid supply connected to one of said pipes for discharging the material in bulk and for liquid supply designed for lowering the effect of velocity differential adjacent to said outlet port of said pipe for supplying liquid on velocity of supply of the material in bulk to said inlet port of said pipe for discharging the material in bulk.

7. An apparatus according to claim 4, wherein said means for increasing the flare angle of the swirled downward annular flow of liquid comprises a diffuser.

8. An apparatus according to claim 4, wherein said means for increasing the flare angle of the swirled downward annular flow of liquid comprises a ring provided at the end of said pipe for discharging the material in bulk on the side of said inlet port thereof.

9. An apparatus according to claim 5, comprising:
an inner cylindrical surface of said pipe for supplying liquid;
a helical groove in said inner cylindrical surface which constitutes said means for an additional swirling of the downward annular flow of liquid.

10. An apparatus according to claim 5, wherein said means for an additional swirling of the downward annular flow of liquid comprises a plurality of guide vanes rigidly secured to one of said pipes for supplying liquid and for discharging the material in bulk.

* * * * *